(12) United States Patent
Wimmer et al.

(10) Patent No.: US 7,240,610 B2
(45) Date of Patent: Jul. 10, 2007

(54) METHOD AND APPARATUS FOR INFUSING A LIQUID WITH A FLAVORING OR A SCENT

(75) Inventors: Carl Wimmer, Graeme Hall (BB); Ramanbir Singh Nayyar, Vancouver (CA)

(73) Assignee: IHC Invest, Inc. (VG)

( * ) Notice: Subject to any disclaimer, the term of this patent is extended or adjusted under 35 U.S.C. 154(b) by 409 days.

(21) Appl. No.: 10/796,097

(22) Filed: Mar. 10, 2004

(65) Prior Publication Data

US 2005/0199127 A1  Sep. 15, 2005

(51) Int. Cl.
*A47J 31/00* (2006.01)

(52) U.S. Cl. .............................. 99/283; 99/287; 99/291; 99/319; 99/323.1; 426/433

(58) Field of Classification Search ............... 99/279, 99/283, 287, 291, 293, 295, 319, 318, 323.1, 99/299; 426/433
See application file for complete search history.

(56) References Cited

U.S. PATENT DOCUMENTS 1,211,614 A * 1/1917 Morales ..................... 99/283
1,225,690 A * 5/1917 Wiberg ...................... 99/298
4,401,014 A * 8/1983 McGrail et al. ............. 99/283
4,984,511 A * 1/1991 Sekiguchi .................... 99/287
5,027,696 A * 7/1991 Antonini ..................... 99/279
5,406,882 A 4/1995 Shaanan
5,453,189 A * 9/1995 Joergensen ................. 210/238
5,895,672 A 4/1999 Cooper
6,095,031 A 8/2000 Warne
6,135,010 A * 10/2000 Husted et al. ................ 99/319
6,324,964 B1 12/2001 Niederberger et al.
6,571,685 B1 6/2003 Lassota
6,915,733 B1 * 7/2005 Langbauer ................. 99/319

FOREIGN PATENT DOCUMENTS

EP       516884       *  9/1992

* cited by examiner

*Primary Examiner*—Reginald L. Alexander
(74) *Attorney, Agent, or Firm*—Vermette & Co.

(57) ABSTRACT

A method and apparatus for infusing a liquid with a flavoring or a scent. The method and apparatus may be used to produce soups and beverages, including tea-based beverages which use various flavoring agents, and also scented products. Further, the method and apparatus allow for fine adjustments to infusion conditions such as submersion time and temperature, and preparation (such as chopping or grinding) of the flavoring or scent agents, to allow for the consistent, repeatable preparation of a high quality flavored or scented liquid.

22 Claims, 2 Drawing Sheets

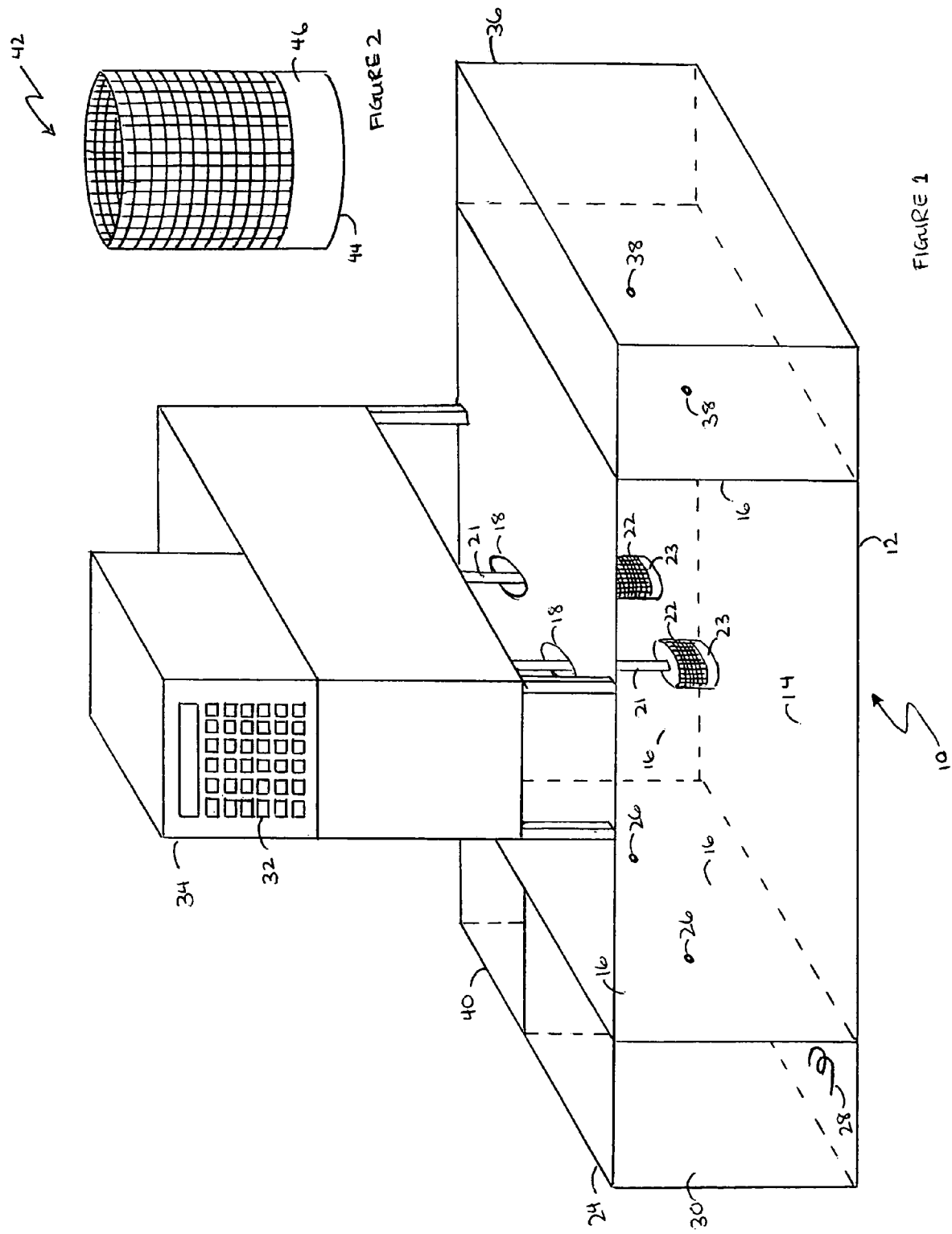

METHOD AND APPARATUS FOR INFUSING A LIQUID WITH A FLAVORING OR A SCENT

FIELD OF THE INVENTION

The present invention generally relates to a process and an electrically operable automatic machine for infusing liquids with a consistent, reproducible flavoring or scent. More particularly, the present invention relates to a process and a machine for infusing liquids with a high quality flavoring or scent by obtaining the appropriate combinations of flavoring or scent agents, using appropriate infusion conditions sensitive to different infusion profiles for various flavoring or scent agents, and maintaining consistency within the liquid base by circulating and mixing the liquid and preventing concentration of flavoring or scent.

BACKGROUND OF THE INVENTION

There has been a dramatic increase in the popularity of various types of chai, spiced tea beverages prepared using combinations of teas, herbs and spices. Common ingredients in a chai include cinnamon, cloves, ginger, and cardamom. Other ingredients used include nutmeg, peppercorn, fennel, anise seed, mint, bay leaves and a blend of teas rather than a single type of tea. Traditionally, chai was served as a hot milk-based drink, sweetened with sugar or honey, but is now popular both hot and cold, and with or without milk and sweeteners.

Along with being a sensuous social drink, chai is known for its ability to relieve stress, counter lethargy, enhance relaxation, settle an upset stomach and even help with digestion. Different tea, herb and spice blends are used to address different ailments. There are many health benefits associated with teas. Tea is known to have naturally occurring antioxidants, which combine with and neutralize free radicals. Free radicals are atoms or molecules with one unpaired electron known to cause cellular damage and believed to accelerate the progression of cancer, cardiovascular disease, and age-related diseases.

Traditionally, the making of a good chai has been a complicated task, requiring much time and many different ingredients. Factors that impact the quality of a chai include the combinations of teas, herbs and spices, the quantities of each ingredient, the proper infusion of flavors throughout the chai product, the right temperature for the infusion process and the duration of the infusion process. Different teas, herbs and spices infuse liquids with flavor at different rates. For example, herbs and spices generally require longer infusion periods than those required by teas. The teas, herbs and spices have different ideal infusion temperatures. A flavoring agent may produce a bitter taste as a result of either a prolonged infusion period or a high infusion temperature. Slow-infusing herbs and spices are often ground to speed up the process of infusion. However, grinding herbs and spices can impact the flavor obtained by embittering the liquid infused. Grinding may cause further exposure of, or increase the surface area of, the husk or skin of a flavoring, which portion tends to produce the bitter taste for many flavoring agents. Proper submersion of the flavoring agents is also important. Tea leaves, tea bags, certain herbs and spices and powdered mixtures tend to float in water and thus prevent proper infusion of the flavors, resulting in weak flavoring or only the surface being flavored. Both the extraction of flavoring and the mixing of the flavored water are facilitated by the agitation of heated water in communication with the flavoring agents.

Disclosed automated processes and machines used to infuse a liquid with a flavoring have various deficiencies and limitations that negatively impact the efficiency of the infusion process, or lower the quality of the flavoring that may be obtained. Most significantly, most of the automated processes and machines used in the preparation of tea beverages do not address the variety of infusion properties among different teas, herbs and spices and, therefore, do not allow for a high quality flavoring.

U.S. Pat. No. 6,324,964 issued to Niederberger et al. discloses an automatic tea-making machine that may be used to prepare a hot beverage, in the course of the preparation of which beverage a flavor is extracted. The invention does not allow for the use of multiple flavoring agents, including teas, herbs and spices, wherein groups of flavoring agents are subjected to different infusion parameters, such as infusion periods and infusion temperatures, dependent on the infusion characteristics of the individual flavoring agents. The tea-preparation chamber is cylindrical in shape, into which a tea strainer of a circular segmental shape is inserted. The agitator, operable to move the water, is located within the portion of the tea-preparation chamber not occupied by the tea strainer. Thus, Niederberger limits the ability of the agitated water to extract flavor from the tea substance, and to circulate the extracted flavoring. Also, while the invention allows for the tea substance to be automatically introduced to and removed from the heated water, there is no mechanism disclosed for preventing dripping of concentrated flavoring upon the removal of the tea substance.

U.S. Pat. No. 5,895,672 issued to Cooper discloses a process for preparing a tea beverage using an espresso machine. Flavor is extracted by passing pressurized water and steam through multiple "pods", each containing a different tea or flavoring agent, through. However, Cooper does not disclose a means of accommodating two different teas or flavoring agents that require different infusion periods.

The market for chai or tea-based beverages continues to grow. There are various factors that may impact the quality of the taste obtained. Because of the demand for such beverages, and the complexity of the traditional process for preparing such beverages, there is a need for a process and machine that allow the quick and easy preparation of a wide variety of such beverages having a consistent, reproducible, high quality. The principles applicable to the preparation of tea beverages may also be used in the preparation of other beverages and soups that require the infusion of flavoring from multiple flavoring agents having different infusion properties. Therefore, there is a need for a process and machine that allow for the quick, easy, consistent, reproducible infusion of a liquid with a high quality flavoring.

With the shift among consumers toward natural products, and away from chemically or artificially products, there is likely to be a market for an apparatus and a process that facilitate the production of scented products that use natural sources. The principles applicable to the preparation of flavored beverages and soups are also applicable to the testing for and preparation of scented liquids, particularly those using scents derived from natural sources. For example, many of the herbs and spices and other flavored agents that are likely to be used in the preparation of a flavored soup or beverage are also valued for valued for their aromas and used in the production of scented products. Scented liquids may be used in the production of products such as cosmetics, soaps, shampoos, perfumes, scented candles and air fresheners. Therefore, a process and machine facilitating the use of natural scent agents in the production of scented liquids would fill a need as yet unrecognized.

SUMMARY OF THE INVENTION

The present invention comprises a machine and process for infusing a liquid with a flavoring or scent. The machine comprises a vessel for containing the liquid. A heat source is used to heat the liquid, and a circulator is used to circulate and mix the liquid. Flavoring or scent agents, which may include teas, herbs, spices and other matter used to obtain a flavoring or scent, are contained in at least two containers. The containers are constructed of a permeable material that allows liquid to flow through the containers to extract a flavoring or scent from the flavoring or scent agents. The containers are coupled to an actuator that independently, and at pre-determined intervals, submerges and removes the containers from the liquid held in the vessel. A drip blocking element is used to prevent concentrated flavoring or scent from dripping into the liquid after the containers are removed from the liquid held in the vessel.

The process for infusing the liquid with a flavoring or scent comprises heating the liquid to a predetermined temperature, circulating and mixing the liquid, submerging multiple flavoring or scent agents into the liquid, removing the flavoring or scent agents from the liquid, and preventing dripping of concentrated flavoring or scent from the flavoring or scent agents upon their removal from the liquid. Each of the flavoring or scent agents is submerged for a predetermined interval.

The machine and process allow for a liquid to be infused with a flavoring or scent, to produce a flavored or scented liquid, using infusion parameters or conditions specific to the particular flavored or scented liquid. The infusion parameters may include infusion temperatures and infusion intervals (which include a start time and an end time). The machine and process can be adapted for small volume or large volume production and vending machines. The automated machine facilitates the infusion of a liquid with a flavoring as no work or intervention is necessary during the infusion process. The user loads the containers with flavoring agents and sets the infusion parameters. The machine then carries out all steps of the process.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

FIG. 1 is a perspective view of the apparatus in accordance with the present invention.

FIG. 2 is a perspective view of a mesh weave receptacle in accordance with the present invention.

DETAILED DESCRIPTION OF THE INVENTION

Figure 3:
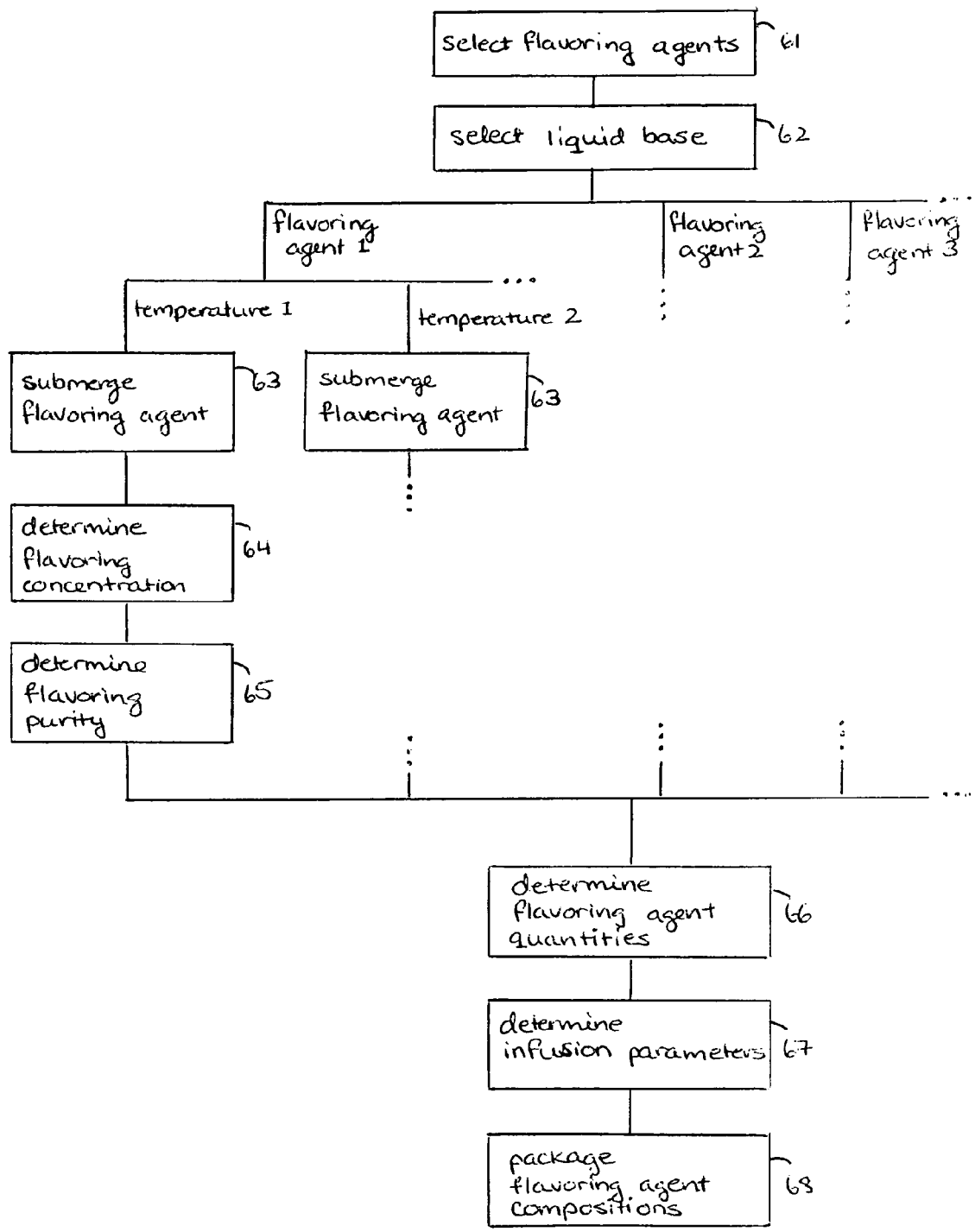
FIG. 3 is a flow chart of the method for obtaining a flavoring product in accordance with the present invention.

The apparatus and method are described herein primarily in the context of the preparation of a liquid infused with a flavoring, more specifically, a tea-based beverage. However, as indicated later in the description and other parts of these specifications, the apparatus and method have wider applications.

Referring to FIG. 1, the infusing apparatus 10 has a vessel 12 closed on the bottom 14 and sides 16 and having an open area 18 in the top 20 through which there extends a pair of containers 22. The containers 22 are mesh weave receptacles. Each container 22 is coupled to a drip blocker 23 consisting of an impermeable bottom and impermeable walls. Each container 22 is suspended from an arm 21 which moves between a fully extended position in which the container 22 is lowered to an interior of the vessel 12 to a retracted position in which the container 22 is fully removed from an interior of the vessel 12. Actuators (not shown) control the movement of each arm of each container 22. A suitable microprocessor circuit (not shown) controls the movement of the containers 22 as well as the other parts of the infusing apparatus 10.

A steam generator 24 is mounted to one side of vessel 12 and provides steam through two steam nozzles 26. The steam is directed into vessel 12 above the bottom 14 but below a surface level of liquid, which is normally present in vessel 12 during the operation of the latter. A copper coil 28 extends into a closed chamber 30 of the steam generator 24 through leak tight seals and couples to a line source of power on the infusing apparatus 10. The copper coil 28 is normally covered with water, which it heats to boiling. The steam so generated enters vessel 12 through the two steam nozzles 26. In a preferred embodiment, the containers 22 are positioned so as to be directly in line with the steam nozzles 26 when the containers 22 are submerged in the water held in vessel 12.

On an end of infusing apparatus 10 is attached a dispenser 40, which provides milk to the vessel 12 through a hose (not shown), the movement of milk being facilitated by a pump (not shown).

On another end of infusing apparatus 10 is attached a gas injection system 36, which is in fluid communication with vessel 12 through two gas nozzles 38. Gas, such as air, is directed into vessel 12 above the bottom 14 but below a surface level of liquid, which is normally present in vessel 12 during the operation of the gas injection system 36. Air can assist in the extraction process by oxygenating the water held in vessel 12. The gas injection system 36 may also provide a means for circulating and mixing the water held in vessel 12.

A product dispensing system (not shown) dispenses serving-sized volumes of the liquid held in vessel 12. In an alterative embodiment, the liquid may be contained in a chamber (not shown) of a size and shape that allows the chamber to be removed and to serve as a portable serving dispenser, structured for example, as a pitcher.

In operation, a selected tea is placed in one of containers 22 and a selected set of flavoring herbs and spices is placed in the other of containers 22. Data corresponding to the selected teas, herbs and spices is entered on a keypad 32 of a control console 34, containing the microprocessor circuit (not shown). The data corresponds to settings such as the volume of the water, an infusion interval for each group of flavoring agents, and an infusion temperature for each flavoring agent group. The infusion interval for each flavoring agent group comprises a start time for extraction and an end time for extraction. The microprocessor circuit is programmed to associate codes, entered using the keypad 32, with sets of infusion parameters specific to various types of beverage or soup preparations.

Water begins to fill up vessel 12 and steam generator 24. Once the desired water level is attained, the power to copper coil 28 is turned on and the water in chamber 30 boils, steam begins to heat up the water in vessel 12 as well as causing circulation of that water. Once the temperature measured by a temperature sensor (not shown) in vessel 12 reaches boiling, the herbs and spices container 22 is lowered into the water in vessel 12 and held there for a first predetermined time. Either at the same time or a later time, container 22 containing the tea is lowered into the water in vessel 12 and held for a second predetermined time.

The heated and circulating water in vessel 12 extracts flavor from the tea, herbs and spices. Steam directed at the containers 22 facilitates the extraction. Steam generator 24 serves both as a heat source and an agitator. Advantages of using steam generator 24 include having no moving parts and no heating surface in contact with the water in vessel 12. Moving parts are susceptible to contamination and breakage. An agitator with moving parts would have limitations on its ability to circulate and mix the water held in vessel 12. For example, the space that moving parts could occupy is limited by containers 22 when containers 22 are lowered into the water held in vessel 12. Use of a heating coil in contact with the liquid held in vessel 12, or of external heating mechanisms applying heat to the bottom 14 or sides 16 of the vessel 12, would result in a heating surface coming into contact with the liquid held in vessel 12. The flavored product could acquire a burnt taste upon substances coming into direct contact with such a heating surface.

Air from the gas injection system 36 facilitates the extraction of flavoring. The containers 22 allow the effective extraction of flavors while preventing the tea, herbs and spices from escaping the containers 22. Once a container 22 is raised, the drip blocker 23 prevents continued dripping of flavoring into vessel 12. The drip blocker 23 prevents over-flavoring the infusion product, and ensures that if the infusion product is removed from the vessel 12 incrementally, for example, by serving size, the infusion product removed from the vessel 12 immediately after the infusion process is complete will contain the same concentration of flavoring as the infusion product removed finally. Dispenser 40 adds milk to the water in vessel 12 in the event a user wishes to have milk with the tea, herbs and spices. Once the milk has been added, the milk and water mixture in vessel 12 is mixed and brought to a boil.

Depending on whether the infusion temperature for the teas is the same as the infusion temperature for the herbs and spices, the infusion intervals for the teas, and the herbs and spices may or may not overlap. However, as the teas generally require a shorter period to infuse a flavoring than do the herbs and spices, the duration for which the teas are lowered into the water held in vessel 12 will generally be shorter than the duration for which the herbs and spices are lowered into that water.

In an alternative embodiment, the water in the steam generator 24 may be heated using alternative heating methods such as a gas flame (not shown) or a heating coil (not shown) externally coupled to the steam generator chamber 30.

There exist alternative methods of heating the liquid held in vessel 12. One alternative is a heating coil (not shown) thermally coupled to either the liquid held in vessel 12, or externally coupled to the vessel 12. Another alternative is to heat the liquid held in vessel 12 by a gas flame (not shown).

There also exist alternative methods of circulating and mixing the liquid held in vessel 12. For example, one method may use a mechanical mixer or a magnetic mixer to circulate and mix the liquid held in vessel 12. Alternatively, a recirculation system could be used such that a hose would draw from the liquid held in vessel 12, a pump facilitating the transport of the drawn liquid, and nozzles would direct jets of the drawn liquid directed into vessel 12 above the bottom 14 but below a surface level of the liquid held in vessel 12.

In another embodiment, the apparatus 10 may be comprised of three or more receptacles for holding flavoring agents, each receptacle holding a group of flavoring agents to be submerged in the liquid in the vessel 12 for a particular infusion interval at a particular infusion temperature.

The containers 22 may be lined with filter paper (not shown) to assist with preventing the flavoring agents from escaping the containers 22. Referring to FIG. 2, in an alternative embodiment, the flavoring agents may be held in two or more holders 42 that are each a mesh weave receptacle having an impermeable bottom 44 and an impermeable wall portion 46.

The dispenser 40 may include a heating mechanism (not shown) to heat the milk before the milk is added to the water in vessel 12. Alternatively, the milk in dispenser 40 may be heated prior to being added to the water in vessel 12 by using the steam generator 24 to inject steam into the milk. Milk, milk products and milk substitutes are subject to denaturing and changes in taste and texture when exposed to heat for a prolonged period. As an entire batch prepared using apparatus 10 may not be consumed immediately after preparation, apparatus 10 may be designed to have dispenser 40 and vessel 12 each dispense its product into a combining chamber (not shown), in amounts in accordance with the selected serving size, in which combining chamber the mixture would be mixed and heated as needed. Another embodiment may allow for the contents of dispenser 40 to be pre-heated and for dispenser 40 and vessel 12 to simultaneously dispense their contents into a beverage holding container when the beverage is desired for consumption.

The apparatus 10 may be used to infuse a liquid with a flavoring in the preparation of a wide variety of beverages and soups. For example, liquids other than water may be held in vessel 12 and infused with a flavoring. Rather than holding tea, herbs and spices for the preparation of a chai, the containers 22 may hold any number, type or combinations of flavoring agents. The gas injection system 36 may be used to inject carbon dioxide into the liquid held in vessel 12 in order to prepare a carbonated beverage. The dispenser 40 may be used to dispense a variety of liquids such as soy milk, cream, flavored syrup, and honey.

Similarly, apparatus 10 may be used to infuse a liquid with a scent in the preparation of scented products, particularly those for which a scent extraction from a natural source is desired. Scented liquids may be used in the production of scented products such as cosmetics, soaps, shampoos, perfumes, and even scented solids such as scented candles and air fresheners. Many of the natural materials described above as flavoring agents usable in preparing flavored liquids such as beverages or soups also carry aromas desired for scented products. The flavor extraction process is similarly able to extract aromas from these natural materials. Rather than holding flavoring agents, containers 22 may hold various types and combinations of scent agents. Dispenser 40 may be used to dispense liquids such as oils and cosmetic creams.

The method for obtaining a flavoring product for use in infusing a liquid base with a flavoring is illustrated in FIG. 3.

The first step 61 in the method is the selection of flavoring agents corresponding to a particular soup or beverage. The combination of flavoring agents used for a soup or beverage may be determined by factors such as the tastes and effects of individual flavoring agents and of the particular combination of flavoring agents. The next step 62 is to select a liquid base to infuse with the flavoring. At step 63, each flavoring agent is submerged into the liquid base heated to a particular temperature to commence extraction of a flavoring. The submersion step 63 is carried out at various temperatures within a range. The concentration of the desired flavoring is determined as a function of time at step 64. At step 65, the purity of the desired flavoring is determined as a function of time. Steps 63 through 65 may be carried out for each of whole, chopped, crushed and ground flavoring agents. Various degrees of grinding, and other preparations of flavoring agents, may also be tested.

By comparing the data collected against standards for the desired soup or beverage, quantities of each of the flavoring agents are determined at step 66, and the infusion parameters are determined at step 67. Determining infusion parameters at step 67 involves grouping the selected flavoring agents into two or more flavoring agent groups such that each group is to be subjected to a particular set of infusion parameters, including an infusion period and an infusion temperature.

In packaging compositions at step 68, the flavoring agents to be used for preparation of a particular type of beverage or soup are packaged together in a package indicating the infusion parameters determined at step 67. Flavoring agent groups are individually packaged within each package.

The method outlined above may also, with small modifications, be used in obtaining a scenting product usable to infuse a liquid base with a scent and to produce a scented product. In the place of flavoring agents, scent agents may be used. Combinations of scent agents would be determined on the basis of smells or scents. Standards would be set for each scented product and the method would be carried out using such standards as a reference point.

Another purpose for the method outlined above is simply to test for the properties or characteristics of a natural material. Due to variations in growing conditions from season to season or year to year, a particular species or even strain of crops may vary dramatically in properties, which include those related to taste and smell. The method described above may be used to determine and quantify properties subject to such variability. Further, the method would allow for the selection and adjustment of parameters, for the use of a particular crop harvest, that would minimize the impact, of the variability of the properties of a crop, on the attributes of a desired end product, whether the crop is used to produce a flavored or scented liquid, or some other product. Such analysis would also allow crop producers to highlight chance or planned features of the crop from a particular season or year and enhance the crop producers' ability to predict characteristics and facilitate the planning of desired properties. Further, apparatus 10 would facilitate carrying out the above method by serving as the equipment used in step 63, particularly in light of its programmability for infusion parameters.

This invention has been described with reference to illustrative embodiments, rather than restrictive embodiments. Accordingly, this description is not intended to be construed in a limiting sense. Various modifications to the illustrative embodiments, as well as other embodiments of the invention, will be apparent to a person skilled in the art upon reference to this description. The scope of the invention is indicated by the appended claims rather than the foregoing description and all such modifications or embodiments that come within the meaning and range and equivalence thereof are intended to be embraced therein.

We claim:

1. An apparatus for infusing a liquid with a flavoring or a scent, the apparatus comprising:
    a) a vessel containing the liquid;
    b) a heat source having a heater which heats the liquid held in said vessel;
    c) a circulator coupled to said vessel which circulates and mixes the liquid held in said vessel;
    d) at least two containers constructed of a permeable material allowing the liquid to flow through said containers to extract a flavoring or scent from the flavoring or scent agents contained therein; and
    e) an actuator coupled to said containers, making said containers independently moveable and, at pre-determined intervals, submerging in and removing said containers from the liquid contained in said vessel.

2. The apparatus according to claim 1, further comprising a drip blocking element coupled to said containers preventing the dripping of concentrated flavoring or scent upon removal of said containers from the liquid in said vessel.

3. The apparatus according to claim 2, wherein said drip blocking element comprises:
    a) an impermeable base; and
    b) impermeable walls in sealing engagement with said base, enclosing said base, and extending upwardly.

4. The apparatus according to claim 1, said containers comprising
    a) an impermeable base;
    b) impermeable walls in sealing engagement with said base, enclosing said base, and extending upwardly; and
    c) liquid permeable walls of said containers extending upwardly from said impermeable walls
    said impermeable base and impermeable walls preventing the
    dripping of concentrated flavoring and scent upon removal of said containers
    from the liquid in said vessel.

5. The apparatus according to claim 1, wherein said containers are permeable only to liquid whereby flavoring and scent may pass through said containers into the liquid in said vessel while flavoring or scent agents are prevented from escaping from said containers.

6. The apparatus according to claim 1, wherein said heat source is comprised of a steam generator.

7. The apparatus according to claim 1, wherein said circulator directs jets of steam into the liquid held in said vessel.

8. The apparatus according to claim 7, wherein said circulator is comprised of:
    a) a steam generator; and
    b) a passageway coupling said steam generator to said vessel, wherein said steam generator injects jets of steam into the liquid in said vessel.

9. The apparatus according to claim 1, wherein said circulator is comprised of a gas circulation system coupled to said vessel that directs jets of gas into the liquid held in said vessel.

10. The apparatus according to claim 1, further comprising a gas injection system coupled to said vessel that directs jets of gas into the liquid to infuse the liquid in said vessel with the gas.

11. The apparatus according to claim 1, further comprising:
    a) a microprocessor controlling said apparatus; and
    b) a data inputting device communicating with said microprocessor.

12. The apparatus according to claim 11, wherein the microprocessor:
 a) allows programming of infusion parameters to produce particular types of flavored or scented liquids; and
 b) in response to inputting codes to said data inputting device selects said infusion parameters.

13. The apparatus according to claim 11, wherein the microprocessor controls infusion parameters, including:
 a) volume of the liquid to be infused with the flavoring or scent;
 b) infusion intervals for contents of each container; and
 c) infusion temperature.

14. A method for infusing a liquid with a flavoring or scent from flavouring or scent agents to produce a flavored or scented liquid, the method comprising:
 (a) heating the liquid to a predetermined temperature;
 (b) circulating and mixing the liquid;
 (c) concurrently submerging a plurality of said flavoring or scent agents into the liquid, at least two of said flavoring or scent agents submerged independently for a corresponding predetermined interval;
 (d) removing said flavoring or scent agents from the liquid;
 (e) preventing dripping of concentrated flavoring or scent upon removal of said flavoring or scent agent.

15. The method according to claim 14, further comprising adjusting the temperature of the liquid to a predetermined temperature corresponding to a flavoring or scent agent prior to submerging said flavoring or scent agent.

16. The method according to claim 14, further comprising heating the liquid to maintain a desired serving temperature after the liquid has been infused with the flavoring or scent.

17. The method according to claim 14, further comprising oxygenating the liquid.

18. The method according to claim 14, further comprising carbonating the liquid.

19. The method according to claim 14, further comprising:
 a) selecting said flavoring or scent agents from a pre-determined list of flavoring or scent agents corresponding to said flavored or scented liquid;
 b) selecting a pre-determined fluid corresponding to said flavored or scented liquid;
 c) individually submerging each of said flavoring or scent agents into the fluid heated to a given temperature within a pre-determined range of temperatures;
 d) determining concentration of a desired flavoring or scent corresponding to each of said flavoring or scent agents as a function of submersion time;
 e) determining purity of a desired flavoring or scent corresponding to each of said flavoring or scent agents as a function of time;
 f) repeating steps (c), (d) and (e) using various temperatures within said pre-determined range of temperatures; and
 g) determining quantities of each of said flavoring or scent agents and infusion parameters corresponding to pre-determined standards for said flavored or scented liquid, said infusion parameters including temperatures and durations for infusion.

20. The method according to claim 19, wherein steps (c) to (f) are carried out for each preparation of each of said flavoring or scent agents which is in the group consisting of:
 a) whole;
 b) chopped;
 c) crushed; and
 d) ground.

21. The method according to claim 19, wherein determining said infusion parameters further comprises grouping said flavoring or scent agents into at least two groups such that a distinct set of infusion conditions may be assigned to each of said groups, said infusion conditions including an infusion interval and an infusion temperature.

22. The method according to claim 19, further comprising:
 a) preparing and packaging said flavoring or scent agents; and
 b) indicating on said package said infusion parameters.

* * * * *